(No Model.) 2 Sheets—Sheet 1.
P. BILLINGHAM.
MEAT MINCING MACHINE.
No. 328,641. Patented Oct. 20, 1885.
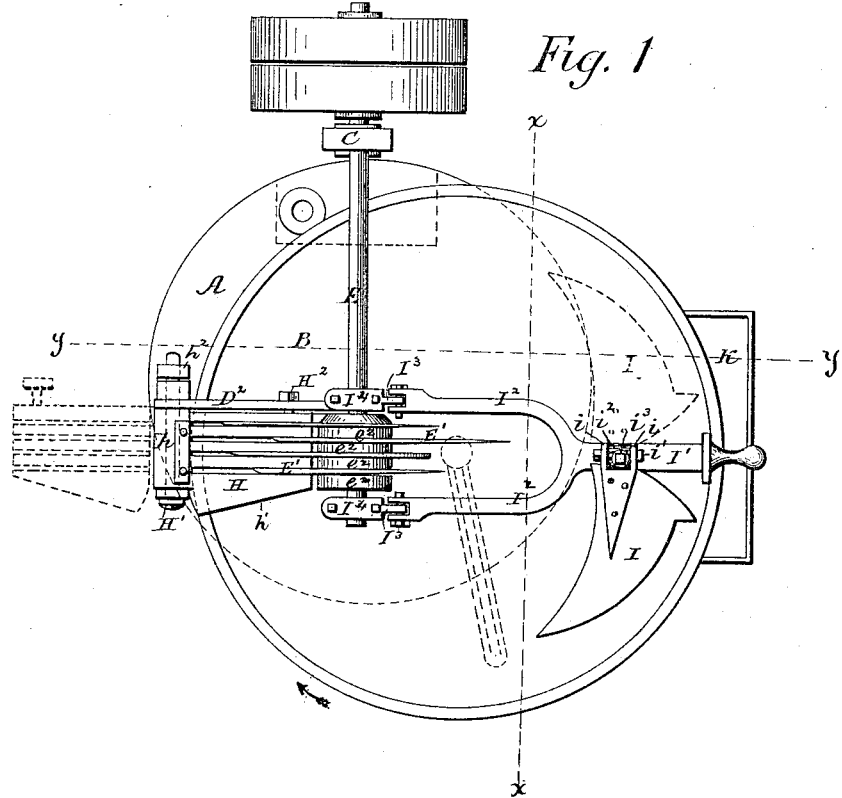
Fig. 1

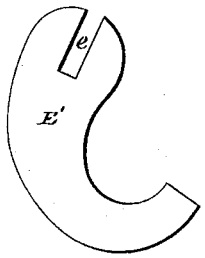

Witnesses:
F. L. Ourand
Jas. K. M⸺Cathran
Inventor:
Phillip Billingham
by his atty
Francis C. Lowthorp, jr.

(No Model.) 2 Sheets—Sheet 2.

P. BILLINGHAM.
MEAT MINCING MACHINE.

No. 328,641. Patented Oct. 20, 1885.

Witnesses:
F. L. Durand
Jas. K. McCathran

Inventor:
Philip Billingham
by his atty.,
Francis C. Lowthorp jr

UNITED STATES PATENT OFFICE.

PHILIP BILLINGHAM, OF TRENTON, NEW JERSEY.

MEAT-MINCING MACHINE.

SPECIFICATION forming part of Letters Patent No. 328,641, dated October 20, 1885.

Application filed February 7, 1885. Serial No. 155,212. (No model.)

*To all whom it may concern:*

Be it known that I, PHILIP BILLINGHAM, a citizen of the United States, residing at Trenton, in the county of Mercer and State of New Jersey, have invented certain new and useful Improvements in Meat-Mincing Machines, of which the following is a specification, reference being had to the accompanying drawings.

My invention relates to that class of machines for mincing meat in which the meat is cut by knives carried by a rotary shaft and working in a rotary bowl, the said shaft and bowl rotating in planes at right angles to each other, the gradual rotation of the bowl serving to feed the meat to the knives regularly and rapidly in a simple and effective manner.

The object of my invention is to provide the knife and cover plate with means for deflecting or pressing the meat down into the bowl and holding it to the action of the knives; to provide novel means for supporting the plow, for lifting it from and for reversing it in the bowl; to provide novel means for lubricating the spindle and bearing of the bowl, and to provide means for adjusting the spindle in its bearing to take up lost motion and insure a steady movement of the bowl to conform the inner surface thereof accurately to the path of the revolving knives, as will be hereinafter described, with reference to the accompanying drawings, where—

Figure 4:
Figure 5:
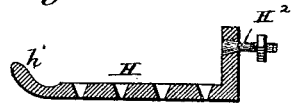
Figure 2:
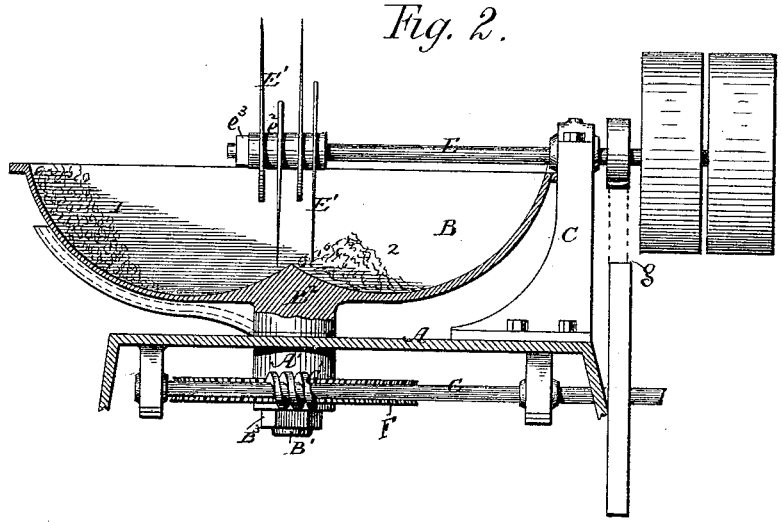
Figure 3:
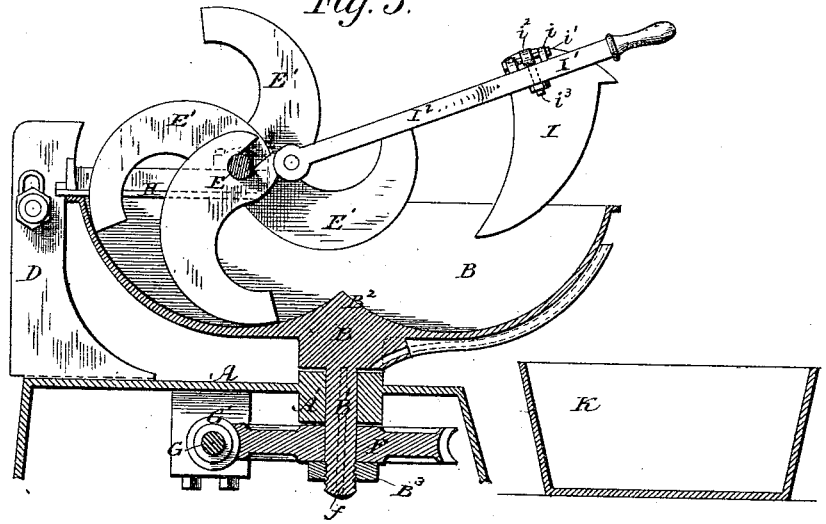

Figure 1 is a plan view of the machine; Fig. 2, a vertical sectional view in the line $x\ x$ of Fig. 1, the knife-plate and plow being removed to more clearly illustrate the disposition of parts; Fig. 3, a similar view in the line $y\ y$ of Fig. 1; Fig. 4, detail views, upon an enlarged scale, of the knife and knife-shaft detached, showing means for securing them together; Fig. 5, an enlarged sectional view of the knife-plate, showing the turned-up edge.

The base-plate A of the machine is circular in form, and is provided with a downwardly-projecting peripheral flange, upon which it rests. Arranged at about equal distances around the base-plate are the bearings for the bowl and the standards which support the knife-shaft.

The bearing A' for the bowl consists of bosses projecting above and below the plate A and a central vertical hole, into which is neatly fitted a stud-spindle, B', cast or screwed in a boss, formed upon the under side of the bowl B. A standard, C, supports the outer end, and a standard, D, provided with an overhanging arm, $D^2$, supports the inner end of the knife-shaft E, which is located horizontally above the bowl B and tangentially to a circular line drawn about midway between the center and rim of the bowl. The bottom of the bowl is formed with a central conical projection, $B^2$, and the inner surface of the bowl thus presents an annular segmental recess, which is concentric with the knife-shaft E, the knives E' working close to the bottom of the bowl.

The spindle B' of the bowl has a worm-wheel, F, gearing into a worm, G', on a shaft, G, adapted to bearings on the base A, and driven by a belt, $g$, from the knife-shafts, as shown in Figs. 2 and 3, so that the bowl is caused to slowly rotate and bring all portions of its contents in succession under the action of the rotating knives.

Hung to the standard D is a slotted knife-plate, H, which is adjusted, as shown in Fig. 1, so as to act in conjunction with the knives E', and insure the cutting of any meat carried up by said knives from the bowl B; or can be thrown outward, as shown by dotted lines in Fig. 1, when it is desired to gain access to the knives for sharpening or other purposes.

The plate H is preferably secured to the standard D by a stud-bolt, H', on said standard, which passes through the sleeve $h$ in the plate, and is held therein by a nut, $h^2$, screwing onto the end of the stud-bolt H'. A set-screw, $H^2$, secures together the adjacent sides of the arm and knife-plate at the inner ends thereof, by which means the slots and cutting-edges of the knife-plate and knives may be accurately adjusted to each other and form together a shearing contact.

The knife-plate H is provided with a curved upturned edge, $h$, as shown. As the bowl revolves in the direction of the arrow, any meat which may be slightly above the level of the knife-plate is deflected or guided downward beneath the same by means of this edge $h$, and subjected to the mincing operation. Were this upturned edge not present some portions of the meat might be lifted upon the top of the knife-plate as the bowl revolved, and thereby escape the cutting action. The effect of the upturned edge, moreover, is to press down the meat into a more compact mass as it passes beneath the knife-plate, whereby it is more evenly subjected to the action of the knives.

Each of the knives E' tapers from the butt to the point, and is of the segmental or cimeter shape shown in Fig. 4, and in the butt of each knife is an open slot, e, for the reception of the squared portion e' of the knife-shaft, as shown in Fig. 4, the knives being clamped between washers $e^2$ $e^2$, and the latter being confined by a nut, $e^3$, adapted to a threaded portion, $e^4$, of the shaft. By this means on slightly loosening one of the nuts $e^3$ any one of the knives can be removed radially from the shaft without disturbing the others, the application of the knives being effected with equal readiness.

As the knives cut both against the bowl and against the plate H, the operation is extremely rapid, and the meat is cut into fine fragments, the mixing of the fragments being also effected, and the operations being performed without any heating of the mass, owing to the fact that the bowl is open at the top, so that the air has access to the meat.

After the meat has been subjected to the action of the knives it will be piled up around the circumferential portion of the bowl, as shown at 1 in Fig. 2, and must be moved back to the central portion of the bowl, as shown at 2 in the same figure, before it is again presented to the action of the knives. This is mechanically effected by a plow-plate, I, sloped to conform to the inner surface of the bowl, and supported upon a hand-lever, I', in an inclined position, as shown in Fig. 1. As the meat is carried around by the rotation of the bowl, it will be scraped from the surface thereof, turned over, and deflected to the central point of the bowl by the inclined inwardly-projecting plow-plate.

The hand-lever I' is bifurcated at its inner end, and the ends of the prongs $I^2$ $I^2$ are pivotally connected with lugs $I^3$ $I^3$, cast upon sleeves $I^4$ $I^4$, secured to the knife-shaft E, upon opposite sides of the knives.

The handle I' of the lever is arranged radially to the center or axis of the bowl, and the plow-plate I is hinged to the said handle by lugs $i$ and bolt $i'$, which passes through a sleeve, $i^2$, secured by a screw-bolt, $i^3$, projecting from the lower or underside of said sleeve and passing into or through the handle.

The bolt $i'$ and hinge-lugs $i$ are in line with the handle and with the axis of the bowl, and the plow can be turned over or reversed to assume a position directly opposite to the position first described, and the plow-plate be thus adapted to fit or conform to the inner surface of the bowl in either position. When the plow is turned to its reverse or second position, as shown by dotted lines in Fig. 1, it will turn the minced or chopped meat out out of the bowl and deposit it in a receptacle, K, as shown in Fig. 2. The plow will thus serve to turn, manipulate, and discharge the meat, without handling it, regularly in a simple and effective manner.

The bowl turns freely in its bearings, and the spindle B' may be lubricated constantly and regularly by means of an oil-tube, $b$, secured beneath the bowl to revolve therewith, and arranged to extend from the outer edge of the bowl to the bearing, within which the spindle is supported. The tube is filled with oil, and as its inner end revolves slowly around the bearing A' the oil will be evenly deposited around its upper surface. The worm-wheel F is loosely secured to slide endwise on the spindle B', and a key, $f$, secured to the spindle and passing through a slot in the hub of the worm-wheel, admits of the endwise movement of the wheel upon the spindle, but locks the wheel and spindle to revolve with each other. A screw-nut, $B^3$, fitting the threaded end of the spindle, admits of the adjustment of the spindle within the hub of the worm-wheel to take up all lost motion as the bearings wear, and secure a smoothly-revolving bearing, and thus prevent the bowl from wabbling or from being subjected to unsteady movement, which would materially affect the working of the knives truly within and to the inner surface of the bowl.

The bowl may be uncovered to cleanse the inner surface thereof, to adjust the knives, and clean the knife-plate and plow by turning the knife-plate outwardly and the plow inwardly upon their hinged connections.

The hinged connection of the plow-lever I' will permit the plow to be lifted from the bowl by its handle when the plow is in either position and such movement will be found convenient and desirable in the various manipulations required. The plow can be held thereby with any required pressure to thoroughly scrape the meat from the inner surface of the bowl.

I am aware that it has been heretofore proposed to hinge or pivot the knife-plate in machines of this character in such manner that said knife-plate may be swung back, so as to uncover the bowl without removing the knife-shaft. I am also aware that the employment of a screw-bolt for adjusting the cutting-edges of the knife-plate to the knives is old. I do not therefore claim such devices.

I claim as my invention and desire to secure by Letters Patent—

1. The combination of the base-plate, the rotating bowl, the knife-shaft E, the outer bearing, C, the bracket D, and the slotted knife-plate H, secured to the bracket to partly cover the bowl, and provided with an upturned edge to deflect and press the meat down into the bowl beneath the plate in its passage to the knives, substantially as described.

2. The combination of the base-plate A with the revolving bowl B, the knife-shaft E, the standards C and D, secured to the base-plate, the hand-lever I', located above the bowl and hinged to sleeves upon the knife-shaft, and the plow-plate I, secured to the lever, substantially as shown and described.

3. The combination of the base-plate A, the revolving bowl B, the shaft E, supported upon bearings or standards secured to the base-plate, a hand-lever, I', hinged to sleeves on the shaft, and a plow-plate secured to the lever and adapted to be lifted thereby from or supported in the bowl, substantially as shown and described.

4. The combination of the base-plate, the revolving bowl, the shaft supported upon bearings or standards secured to the base-plate, a hand-lever hinged to sleeves upon the shaft, and the plow-plate pivotally and reversibly connected to the hand-lever, substantially as shown and described.

5. The combination, with the base-plate provided with a bearing, of the revolving knives, the revolving bowl provided with a stud-spindle projecting therefrom and supported in the bearing, and an oil-tube secured to and arranged beneath and revolving with the bowl to extend to the stud-spindle and deliver the oil around the bearing by the revolution of the bowl, substantially as described.

6. The combination, with the base-plate provided with the bearing, of the revolving knives, the bowl provided with a stud-spindle supported in the bearing, the worm-wheel keyed to slide or be adjusted upon the spindle to revolve the bowl, and a screw-nut adjustable upon the spindle to hold the worm-wheel thereon and take up lost motion between the spindle and bearing, substantially as described.

In testimony whereof I have affixed my signature in presence of two witnesses.

PHILIP BILLINGHAM.

Witnesses:
BARTON B. HUTCHINSON,
F. C. LOWTHORP, Jr.